United States Patent [19]

Sens et al.

[11] Patent Number: 5,545,235
[45] Date of Patent: Aug. 13, 1996

[54] THERMAL TRANSFER OF PYRIDONE DYES

[75] Inventors: Rüdiger Sens, Mannheim; Karl-Heinz Etzbach, Frankenthal, both of Germany

[73] Assignee: BASF Aktiengesellschaft, Ludwigshafen, Germany

[21] Appl. No.: 424,098

[22] Filed: Apr. 19, 1995

[30] Foreign Application Priority Data

May 2, 1994 [DE] Germany ............ 44 15 358.9

[51] Int. Cl.$^6$ .............. B41M 5/035; C07D 417/06; C07D 417/12
[52] U.S. Cl. ............................. 8/471; 503/227
[58] Field of Search ............... 8/471, 690, 691; 503/227

[56] References Cited

U.S. PATENT DOCUMENTS

| | | |
|---|---|---|
| 5,079,365 | 1/1992 | Sens et al. |
| 5,132,438 | 7/1992 | Bach et al. |
| 5,389,596 | 2/1995 | Etzbach et al. ............... 503/227 |

FOREIGN PATENT DOCUMENTS

| | | |
|---|---|---|
| 0416434 | 3/1991 | European Pat. Off. |
| 0569785 | 11/1993 | European Pat. Off. |
| 0569784 | 11/1993 | European Pat. Off. |
| WO92/19684 | 11/1992 | WIPO |

*Primary Examiner*—Margaret Einsmann
*Attorney, Agent, or Firm*—Oblon, Spivak, McClelland, Maier, & Neustadt, P.C.

[57] ABSTRACT

A process for transferring dyes from a transfer to plastic-coated paper by diffusion or sublimation with the aid of an energy source comprises using a transfer on which there is or are one or more pyridone dyes of the formula

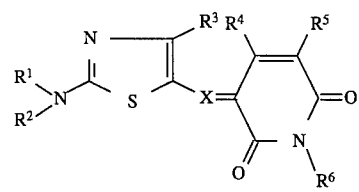

where X is nitrogen or CH, $R^1$ and $R^2$ are each substituted or unsubstituted $C_1$–$C_{10}$-alkyl, $C_5$–$C_7$-cycloalkyl, $C_3$–$C_4$-alkenyl or substituted or unsubstituted phenyl, or $R^1$ and $R^2$ are together with the nitrogen atom joining them together a heterocyclic radical, $R^3$ is $C_3$–$C_{10}$-alkyl or $C_5$–$C_7$-cycloalkyl, $R^4$ is hydrogen, $C_1$–$C_4$-alkyl or substituted or unsubstituted phenyl, $R^5$ is cyano, substituted or unsubstituted carbamoyl, carboxyl, $C_1$–$C_8$-alkoxycarbonyl or benzimidazolyl, and $R^6$ is substituted or unsubstituted $C_1$–$C_{10}$-alkyl, $C_5$–$C_7$-cycloalkyl or substituted or unsubstituted phenyl.

11 Claims, No Drawings

THERMAL TRANSFER OF PYRIDONE DYES

The present invention relates to a novel process for the thermal transfer of methine or azamethine dyes based on thiazolopyridone.

In the thermal transfer printing process, a transfer sheet which contains a thermally transferable dye in one or more binders with or without suitable auxiliaries on a support material is heated from the back with an energy source, for example with a thermal head or a laser, for short periods (duration: fractions of a second), causing the dye to migrate out of the transfer sheet and diffuse into the surface coating of a receiving medium. The essential advantage of this process is that the amount of dye to be transferred is easy to control by controlling the energy to be emitted by the energy source.

Generally, color recording is carried out using the three subtractive primaries of yellow, magenta and cyan (with or without black).

U.S. Pat. No. 5,079,365 discloses the thermal transfer of thiazolomethine-pyridine dyes. However, it has been found that the dyes used there still have application defects.

It is an object of the present invention to provide a novel thermal transfer printing process whereby specific thiazolopyridone-based methine or azamethine dyes are transferred to the substrate with advantageous application properties.

We have found that this object is achieved by a process for transferring dyes from a transfer to plastic-coated paper by diffusion or sublimation with the aid of an energy source, which comprises using a transfer on which there is or are one or more pyridone dyes of the formula I

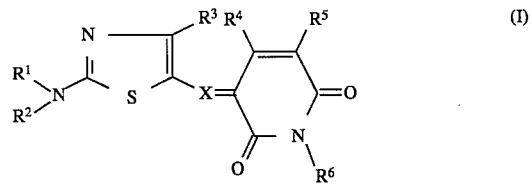

where

X is nitrogen or CH, $R^1$ and $R^2$ are identical or different and each is independently of the other $C_1$–$C_{10}$-alkyl with or without substitution by $C_1$–$C_4$-alkoxycarbonyl, $C_1$–$C_4$-alkoxycarbonyloxy or phenyl and with or without interruption by from 1 to 4 oxygen atoms in ether function, $C_5$–$C_7$-cycloalkyl, $C_3$–$C_4$-alkenyl, unsubstituted or $C_1$–$C_4$-alkyl-, $C_1$–$C_4$-alkoxy- or halogen-substituted phenyl, or $R^1$ and $R^2$ are together with the nitrogen atom joining them together a 5- or 6-membered saturated heterocyclic radical with or without further hetero atoms, $R^3$ is $C_3$–$C_{10}$-alkyl or $C_5$–$C_7$-cycloalkyl, $R^4$ is hydrogen, $C_1$–$C_4$-alkyl or unsubstituted or $C_1$–$C_4$-alkyl-, $C_1$–$C_4$-alkoxy- or halogen-substituted phenyl, $R^5$ is cyano, carbamoyl, mono- or di($C_1$–$C_8$-alkyl) carbamoyl, carboxyl, $C_1$–$C_8$-alkoxycarbonyl or benzimidazolyl, and $R^6$ is $C_1$–$C_{10}$-alkyl with or without substitution by phenyl, phenoxy, cyclohexyloxy or pyrazolyl and with or without interruption by from 1 to 4 oxygen atoms in ether function, $C_5$–$C_7$-cycloalkyl or unsubstituted or $C_1$–$C_4$-alkyl-, $C_1$–$C_4$-alkoxy- or halogen-substituted phenyl.

Any alkyl or alkenyl appearing in the abovementioned formula I may be straight-chain or branched.

Any substituted alkyl appearing in the abovementioned formula I generally comprises 1 or 2 substituents.

Any substituted phenyl appearing in the abovementioned formula I generally comprises from 1 to 3, preferably 1 or 2, substituents.

$R^1$, $R^2$, $R^4$ and $R^6$ are each for example methyl or ethyl.

$R^3$ as well as $R^1$, $R^2$, $R^4$ and $R^6$ are each for example propyl, isopropyl, butyl, isobutyl, sec-butyl or tert-butyl.

$R^1$, $R^2$, $R^3$ and $R^6$ may each also be for example pentyl, isopentyl, tert-pentyl, hexyl, 2-methylpentyl, heptyl, octyl, 2-ethylhexyl, isooctyl, nonyl, isononyl, decyl or isodecyl (the designations isooctyl, isononyl and isodecyl are trivial names derived from the oxo process alcohols—cf. Ullmann's Encyclopedia of Industrial Chemistry, 5th Edition, Vol. A 1, pages 290 to 293, and Vol. A 10, pages 284 and 285), cyclopentyl, methylcyclopentyl, dimethylcyclopentyl, cyclohexyl, methylcyclohexyl or cycloheptyl.

$R^1$, $R^2$ and $R^6$ may each also be for example benzyl, 1- or 2-phenylethyl, 2-methoxyethyl, 2-ethoxyethyl, 2-propoxyethyl, 2-isopropoxyethyl, 2-butoxyethyl, 2- or 3-methoxypropyl, 2- or 3-ethoxypropyl, 2- or 3-propoxypropyl, 2- or 3-butoxypropyl, 2- or 4-methoxybutyl, 2- or 4-ethoxybutyl, 2- or 4-propoxybutyl, 2- or 4-butoxybutyl, 3,6-dioxaheptyl, 3,6-dioxaoctyl, 4,8-dioxanonyl, 3,7-dioxaoctyl, 3,7-dioxanonyl, 4,7-dioxaoctyl, 4,7- dioxanonyl, 4,8-dioxadecyl, 3,6,8-trioxadecyl, 3,6,9-trioxaundecyl, 3,6,9,12-tetraoxatridecyl or 3,6,9,12-tetraoxatetradecyl.

$R^1$ and $R^2$ may each also be for example 2-methoxycarbonylethyl, 2-ethoxycarbonylethyl, 2-propoxycarbonylethyl, 2-isopropoxycarbonylethyl, 2-butoxycarbonylethyl, 2- or 3-methoxycarbonylpropyl, 2- or 3-ethoxycarbonylpropyl, 2- or 3-propoxycarbonylpropyl, 2- or 3-butoxycarbonylpropyl, 2- or 4-methoxycarbonylbutyl, 2- or 4-ethoxycarbonylbutyl, 2- or 4-propoxycarbonylbutyl, 2- or 4-butoxycarbonylbutyl, 2-methoxycarbonyloxyethyl, 2-ethoxycarbonyloxyethyl, 2-propoxycarbonyloxyethyl, 2-isopropoxy- carbonyloxyethyl, 2-butoxycarbonyloxyethyl, 2- or 3-methoxy- carbonyloxypropyl, 2- or 3-ethoxycarbonyloxypropyl, 2- or 3- propoxycarbonyloxypropyl, 2- or 3-butoxycarbonyloxypropyl, 2- or 4-methoxycarbonyloxybutyl, 2- or 4-ethoxycarbonyloxybutyl, 2- or 4-propoxycarbonyloxybutyl, 2- or 4-butoxycarbonyloxybutyl, prop-1-en-3-yl, but-2-en-4-yl or 2-methylprop-1-en-3-yl.

$R^6$ may also be for example 2-benzyloxyethyl, 2-pyrazol-1-ylethyl, 2- or 3-benzyloxypropyl, 2- or 3-pyrazol-1-ylpropyl, 2- or 4-benzyloxybutyl, 2- or 4-pyrazol-1-ylbutyl, 2-phenoxyethyl, 2- or 3-phenoxypropyl, 2- or 4-phenoxybutyl, 2-cyclohexyloxyethyl, 2- or 3-cyclohexyloxypropyl or 2- or 4-cyclohexyloxybutyl.

$R^4$ and $R^6$ may each also be for example phenyl, 2-, 3- or 4-methylphenyl, 2-, 3- or 4-ethylphenyl, 2-, 3- or 4-propylphenyl, 2-, 3- or 4-isopropylphenyl, 2-, 3- or 4-butylphenyl, 2,3-, 2,4- or 2,6-dimethylphenyl, 2-, 3- or 4-methoxyphenyl, 2-, 3- or 4-ethoxyphenyl, 2,3-, 2,4- or 2,6-dimethoxyphenyl, 2-, 3- or 4-fluorophenyl, 2-, 3- or 4-chlorophenyl or 2-, 3- or 4-bromophenyl.

$R^5$ may also be for example mono- or dimethylcarbamoyl, mono- or diethylcarbamoyl, mono- or dipropylcarbamoyl, mono- or diisopropylcarbamoyl, mono- or dibutylcarbamoyl, mono- or dipentylcarbamoyl, mono- or dihexylcarbamoyl, mono- or diheptylcarbamoyl, mono- or dioctylcarbamoyl, mono- or bis(2-ethylhexyl)carbamoyl, N-methyl-N-ethylcarbamoyl, methoxycarbonyl, ethoxycarbonyl, propoxycarbonyl, isopropoxycarbonyl, butoxycarbonyl, isobutoxycarbonyl, pentyloxycarbonyl, isopentyloxycarbonyl, hexyloxycarbonyl, heptyloxycarbonyl, octyloxycarbonyl, isooctylcarbonyl or 2-ethylhexyloxycarbonyl.

$R^1$ and $R^2$ together with the nitrogen atom joining them together forming a 5- or 6-membered saturated heterocyclic radical with or without further hetero atoms can be for example pyrrolidinyl, piperidinyl, piperazinyl, N-($C_1$–$C_4$-alkyl)-piperazinyl, morpholinyl, thiomorpholinyl, thiomorpholinyl-S,S- dioxide or hexahydroazepinyl.

If the radicals $R^1$ and $R^2$ in the formula I are each $C_1$–$C_{10}$-alkyl or if one of the radicals $R^1$ and $R^2$ is $C_1$–$C_{10}$-alkyl and the other is $C_5$–$C_7$-cycloalkyl, preference is given to a process wherein there is used a transfer on which there is or are one or more pyridone dyes of the formula I in which the sum of the carbon atoms present in the two radicals $R^1$ and $R^2$ is at least 7, preferably at least 8.

Preference is further given to a process which comprises the use of a transfer on which there is or are one or more pyridone dyes of the formula I where X is CH.

Preference is further given to a process which comprises the use of a transfer on which there is or are one or more pyridone dyes of the formula I where $R^4$ is methyl.

Preference is further given to a process which comprises the use of a transfer on which there is or are one or more pyridone dyes of the formula I where $R^5$ is cyano.

Preference is further given to a process which comprises the use of a transfer on which there is or are one or more pyridone dyes of the formula I where $R^3$ is branched $C_3$–$C_{10}$-alkyl, in particular $C_3$–$C_8$-alkyl.

Preference is further given to a process which comprises the use of a transfer on which there is or are one or more pyridone dyes of the formula I where $R^6$ is $C_1$–$C_8$-alkyl, cyclopentyl, cyclohexyl or unsubstituted or $C_1$–$C_4$-alkyl- or $C_1$–$C_4$-alkoxy-substituted phenyl.

Preference is further given to a process which comprises the use of a transfer on which there is or are one or more pyridone dyes of the formula I where $R^1$ and $R^2$ are each independently of the other $C_1$–$C_8$-alkyl which may be $C_1$–$C_4$-alkoxy-, $C_1$–$C_4$-alkoxycarbonyl- or phenyl-substituted, cyclopentyl, cyclohexyl or prop-1-en-3-yl.

Particular preference is given to a process which comprises using a transfer on which there is or are one or more pyridone dyes of the formula I where $R^3$ is branched $C_3$–$C_6$-alkyl, especially isopropyl or isobutyl.

Particular preference is further given to a process which comprises using a transfer on which there is or are one or more pyridone dyes of the formula I where $R^6$ is $C_4$–$C_8$-alkyl or cyclohexyl.

Particular preference is further given to a process which comprises using a transfer on which there is or are one or more pyridone dyes of the formula I where $R^1$ and $R^2$ are each independently of the other $C_4$–$C_8$-alkyl, $C_1$–$C_4$-alkoxy-$C_2$–$C_4$-alkyl, $C_1$–$C_4$-alkoxycarbonyl-$C_2$–$C_4$-alkyl, benzyl or prop-1-en-3-yl or where one of $R^1$ and $R^2$ is $C_1$–$C_4$-alkyl and the other is cyclohexyl.

Very particular preference is given to a process which comprises using a transfer on which there is or are one or more pyridone dyes of the formula I where $R^1$ and $R^2$ are each independently of the other $C_4$–$C_8$-alkyl, benzyl or prop-1-en-3-yl.

Particular preference is further given to a process which comprises using a transfer on which there is or are one or more pyridone dyes of the formula I where $R^3$ is tert-butyl.

The pyridone dyes of the formula I are known per se and described for example in the earlier Patent Application PCT/EP 94/04114 or can be obtained by the methods mentioned therein.

To make the transfers required for the process of the present invention, the pyridone dyes of the formula I are incorporated in a suitable organic solvent or a mixture of solvents with one or more binders with or without auxiliaries to form a printing ink. This printing ink preferably contains the dyes in a molecularly disperse, i.e. dissolved, form. The printing ink can be applied to the inert support by means of a doctor blade and air dried. Suitable organic solvents for the dye mixtures include for example those in which the solubility of the dye mixtures at a temperature of 20° C. is greater than 1% by weight, preferably greater than 5% by weight.

Examples are ethanol, propanol, isobutanol, tetrahydrofuran, methylene chloride, methyl ethyl ketone, cyclopentanone, cyclohexanone, toluene, chlorobenzene or mixtures thereof.

Suitable binders include all resins or polymer materials which are soluble in organic solvents and which are capable of binding the dye mixtures to the inert support sufficiently firmly as to prevent rubbing off. Preference is given to those binders which, after the air drying of the printing ink, include the dye mixture in the form of a clear, transparent film without any visible crystallization of the dye mixture.

Such binders are mentioned for example in U.S. Pat. No. 5,132,438 or in the corresponding patent applications cited therein. Also suitable are saturated linear polyesters.

Preferred binders include ethylcellulose, ethylhydroxyethylcellulose, polyvinyl butyral, polyvinyl acetate, cellulose propionate or saturated linear polyesters.

The weight ratio of binder: dye generally ranges from 1:1 to 10:1.

Suitable auxiliaries include for example release agents as mentioned in U.S. Pat. No. 5,132,438 or the corresponding patent applications cited therein.

Also suitable are especially organic additives which prevent the crystallizing out of the transfer dyes in the course of storage or on heating of the color ribbon, for example cholesterol or vanillin.

Suitable inert supports are described for example in U.S. Pat. No. 5,132,438 or in the corresponding patent applications cited therein. The thickness of the support generally ranges from 3 to 30 μm, preferably from 5 to 10 μm.

Suitable dye receiver layers include in principle all thermally stable plastics layers with affinity for the dyes to be transferred, for example modified polycarbonates or polyesters. Further details can be found for example in U.S. Pat. No. 5,132,438 or the relevant patent applications cited therein.

The transfer is effected by means of an energy source, for example by means of a laser or a thermal head, for which the latter has to be heatable to a temperature of ≧300° C. so that the transfer of the dye can take place within the time range t: 0<t<15 msec. The dye migrates out of the transfer sheet and diffuses into the surface coating of the receiving medium.

The pyridone dyes of the formula I used in the process of the present invention are notable for advantageous application properties. They exhibit high solubility in the color ribbon (good compatibility with the binder), a high stability in the printing ink, good transferability, high image stability (i.e. good lightfastness and also good stability to environmental effects, for example moisture, temperature or chemicals), and permit flexible coloristic adaptation to given subtractive primary colors as part of an optimal trichromat. They are also notable for high brilliance owing to the high transparency in the blue and red parts of the spectrum.

The Examples which follow illustrate the invention.

General Method a) 10 g of dye are stirred, if necessary with brief heating to 80°–90° C., into 100 g of a 10% strength by weight solution of a binder in 4.5:2:2 v/v/v methyl ethyl ketone/toluene/cyclohexanone.

The mixture is applied with a 6 μm doctor blade to a 6 μm thick polyester film which has a suitable subbing layer on the back and is blown dry with a hair dryer in the course of 1 minute. Before the color ribbon can be printed, it has to be air dried for at least a further 24 hours, since residual solvent can impair the printing process.

b) The color ribbons are printed on an experimental computer-controlled apparatus equipped with a commercial thermal printing head onto commercial color videoprint paper (Hitachi).

The voltage is altered to control the energy emitted by the thermal printing head, the length of a pulse having been set to 7 ms and only one pulse being emitted at a time. The emitted energy level ranges from 0.7 to 2.0 mJ/dot.

Since the depth of the color is directly proportional to the supplied energy, it is possible to use a color wedge for spectroscopic evaluation.

The depth of the color is plotted against the supplied energy per heating element to determine the $Q^*$ value (=energy in mJ for the absorbance value of 1) and the gradient m in 1/mJ.

The results obtained are shown together with the $\lambda_{max}$ values (measured on the videoprint paper) below in Tables 1 to 3.

The binder used in each case was a product based on the saturated linear polyester and on polyvinyl butyral, the first value in the tables for each example being measured with the polyester as binder and the second with polyvinyl butyral as binder.

TABLE 1

$$\begin{array}{c} R^1 \\ \diagdown \\ N \\ \diagup \\ R^2 \end{array} \!\!=\!\! N \!-\!\! \begin{array}{c} R^3 \\ | \\ C \\ \| \\ C \\ | \\ S \end{array} \!\!-\!\! CH \!=\!\! \begin{array}{c} CH_3 \\ | \\ C \\ \| \\ C \\ | \\ C=O \\ | \\ N \\ | \\ R^6 \end{array} \!\!=\!\! \begin{array}{c} CN \\ | \\ C \\ \| \\ O \end{array}$$

| Ex. No. | R¹ | R² | R³ | R⁶ | Q* [mJ/dot] | m [1/mJ] | λ_max [nm] |
|---|---|---|---|---|---|---|---|
| 1 | C₂H₅ | C₂H₅ | C(CH₃)₃ | CH(C₂H₅)CH₃ | 0.72, 0.77 | 4.13, 3.86 | 531 |
| 2 | C₂H₅ | C₂H₅ | C(CH₃)₃ | CH₃ | 0.73, 0.76 | 5.37, 4.11 | 534 |
| 3 | C₄H₉ | C₄H₉ | CH(CH₃)₂ | CH₃ | 0.74, 0.76 | 4.43, 3.98 | 528 |
| 4 | CH₂CH(CH₃)₂ | CH₂CH(CH₃)₂ | C(CH₃)₃ | C₄H₉ | 0.74, 0.81 | 4.74, 4.18 | 538 |
| 5 | C₄H₉ | C₄H₉ | CH(C₂H₅)C₄H₉ | C₆H₁₃ | 0.75, 0.73 | 3.85, 3.18 | 528 |
| 6 | CH₃ | CH₃ | C(CH₃)₃ | C₄H₉ | 0.75, 0.79 | 4.72, 3.98 | 531 |
| 7 | CH₃ | CH₃ | C(CH₃)₃ | C₆H₁₃ | 0.75, 0.80 | 4.28, 3.83 | 531 |
| 8 | C₄H₉ | C₄H₉ | C₃H₇ | CH₃ | 0.76, 0.77 | 3.41, 3.86 | 531 |
| 9 | CH(CH₃)C₂H₅ | CH(CH₃)C₂H₅ | C(CH₃)₃ | CH₃ | 0.76, 0.85 | 3.79, 2.92 | 537 |
| 10 | C₂H₅ | C₂H₅ | C(CH₃)₃ | C₄H₉ | 0.76, 0.79 | 3.12, 4.51 | 534 |
| 11 | C₂H₅ | C₂H₅ | C(CH₃)₃ | C₆H₁₃ | 0.76, 0.81 | 4.28, 3.59 | 536 |
| 12 | CH(CH₃)C₂H₅ | CH(CH₃)C₂H₅ | C(CH₃)₃ | C₄H₉ | 0.77, 0.82 | 4.52, 3.50 | 538 |
| 13 | C₂H₅ | C₂H₅ | C(CH₃)₃ | C₃H₆OC₂H₄OC₂H₅ | 0.77, 0.80 | 4.03, 3.69 | 533 |
| 14 | CH(CH₃)₂ | CH(CH₃)₂ | CH(C₂H₅)C₄H₉ | CH₃ | 0.77, 0.81 | 3.51, 2.88 | 528 |
| 15 | CH(CH₃)₂ | CH(CH₃)₂ | C(CH₃)₃ | C₄H₉ | 0.77, 0.82 | 4.25, 3.62 | 537 |
| 16 | C₄H₉ | C₄H₉ | CH(CH₃)₂ | C₄H₉ | 0.78, 0.78 | 3.94, 3.91 | 528 |
| 17 | C₄H₉ | C₄H₉ | C₆H₁₁ | CH₃ | 0.78, 0.85 | 3.07, 2.70 | 531 |
| 18 | C₄H₉ | C₄H₉ | C₃H₇ | C₆H₁₃ | 0.78, 0.87 | 3.40, 2.56 | 529 |
| 19 | C₄H₉ | C₄H₉ | C(CH₃)₃ | C₃H₆OCH₃ | 0.78, 0.84 | 3.80, 3.62 | 536 |
| 20 | CH₂CH(CH₃)₂ | CH₂CH(CH₃)₂ | C(CH₃)₃ | CH₃ | 0.78, 0.80 | 3.95, 3.89 | 537 |
| 21 | CH₂CH(CH₃)₂ | CH₂CH(CH₃)₂ | C(CH₃)₃ | C₆H₁₃ | 0.78, 0.82 | 4.19, 3.45 | 539 |
| 22 | CH₃ | CH₃ | C(CH₃)₃ | C₃H₆OC₂H₄OC₂H₅ | 0.78, 0.77 | 4.21, 3.94 | 531 |
| 23 | CH(CH₃)₂ | CH(CH₃)₂ | C(CH₃)₃ | C₆H₁₃ | 0.78, 0.84 | 3.64, 3.58 | 537 |
| 24 | C₄H₉ | C₄H₉ | C(CH₃)₃ | CH₂C₆H₅ | 0.78, 0.82 | 3.89, 3.46 | 535 |
| 25 | C₄H₉ | C₄H₉ | CH(C₂H₅)C₄H₉ | CH₃ | 0.79, 0.83 | 3.20, 2.54 | 528 |
| 26 | C₄H₉ | C₄H₉ | C(CH₃)₃ | C₂H₄OCH₃ | 0.79, 0.80 | 3.01, 3.58 | 537 |
| 27 | C₄H₉ | C₄H₉ | CH(C₂H₅)C₄H₉ | C₄H₉ | 0.79, 0.79 | 3.43, 3.11 | 528 |
| 28 | CH(CH₃)C₂H₅ | CH(CH₃)C₂H₅ | C(CH₃)₃ | C₆H₁₃ | 0.79, 0.80 | 4.38, 3.34 | 538 |
| 29 | CH(CH₃)₂ | CH(CH₃)₂ | CH(C₂H₅)C₄H₉ | C₄H₉ | 0.79, 0.85 | 3.64, 3.19 | 530 |
| 30 | CH(CH₃)₂ | CH(CH₃)₂ | C(CH₃)₃ | CH₃ | 0.79, 0.82 | 3.35, 2.97 | 535 |
| 31 | CH(CH₃)₂ | CH(CH₃)₂ | CH(C₂H₅)C₄H₉ | C₆H₁₃ | 0.80, 0.85 | 3.41, 2.76 | 530 |
| 32 | C₄H₉ | C₄H₉ | C(CH₃)₃ | CH₃ | 0.81, 0.92 | 3.92, 2.92 | 535 |
| 33 | C₄H₉ | C₄H₉ | C₆H₁₁ | C₆H₁₃ | 0.82, 0.85 | 2.49, 2.95 | 532 |
| 34 | CH₃ | CH₃ | CH(C₂H₅)C₄H₉ | C₄H₉ | 0.83, 0.86 | 3.39, 3.25 | 524 |
| 35 | CH(CH₃)C₂H₅ | CH(CH₃)C₂H₅ | C(CH₃)₃ | CH₂C₆H₅ | 0.83, 0.90 | 3.69, 2.91 | 540 |
| 36 | C₄H₉ | C₄H₉ | CH(CH₃)₂ | C₆H₁₃ | 0.84, 0.84 | 3.46, 3.59 | 531 |
| 37 | CH₃ | CH₃ | CH(C₂H₅)C₄H₉ | C₆H₁₃ | 0.84, 0.93 | 3.26, 2.53 | 524 |
| 38 | C₆H₁₃ | C₆H₁₃ | C₆H₁₁ | CH₃ | 0.85, 0.86 | 2.85, 2.54 | 532 |
| 39 | C₄H₉ | C₄H₉ | C₆H₁₁ | C₄H₉ | 0.86, 0.86 | 2.06, 2.41 | 531 |
| 40 | C₆H₁₃ | C₆H₁₃ | C₆H₁₁ | C₄H₉ | 0.86, 0.88 | 2.91, 2.52 | 532 |
| 41 | C₆H₁₃ | C₆H₁₃ | C₆H₁₁ | C₆H₁₃ | 0.86, 0.87 | 2.74, 2.28 | 532 |
| 42 | C₆H₁₁ | C₆H₁₁ | C(CH₃)₃ | C₆H₁₃ | 0.86, 0.95 | 3.36, 2.45 | 541 |
| 43 | C₄H₉ | C₄H₉ | C(CH₃)₃ | C₄H₉ | 0.90, 0.90 | 3.36, 4.21 | 537 |
| 44 | C₄H₉ | C₄H₉ | C(CH₃)₃ | C₆H₁₃ | 0.90, 0.99 | 3.44, 2.13 | 537 |
| 45 | CH₃ | CH₃ | CH(C₂H₅)C₄H₉ | CH₃ | 0.90, 0.87 | 2.71, 3.24 | 523 |
| 46 | CH₂C₆H₅ | CH₂C₆H₅ | C(CH₃)₃ | CH₃ | 0.91, 0.98 | 3.17, 2.55 | 534 |
| 47 | CH₂C₆H₅ | CH₂C₆H₅ | C(CH₃)₃ | C₄H₉ | 0.91, 0.90 | 2.92, 2.84 | 533 |
| 48 | CH₂C₆H₅ | CH₂C₆H₅ | C(CH₃)₃ | C₆H₁₃ | 0.93, 0.91 | 2.93, 2.50 | 534 |

TABLE 1-continued

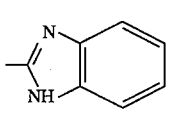

| Ex. No. | R$^1$ | R$^2$ | R$^3$ | R$^6$ | Q* [mJ/dot] | m [1/mJ] | $\lambda_{max}$ [nm] |
|---|---|---|---|---|---|---|---|
| 49 | C$_6$H$_{11}$ | C$_6$H$_{11}$ | C(CH$_3$)$_3$ | C$_4$H$_9$ | 0.98, 0.97 | 3.14, 2.57 | 540 |
| 50 | C$_6$H$_{11}$ | C$_6$H$_{11}$ | C(CH$_3$)$_3$ | CH$_3$ | 1.02, 1.00 | 2.20, 2.36 | 540 |

TABLE 2

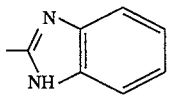

| Ex. No. | R$^1$ | R$^2$ | R$^3$ | R$^6$ | R$^5$ | R$^4$ | Q* [mJ/dot] | m[1/mJ] | $\lambda_{max}$ [nm] |
|---|---|---|---|---|---|---|---|---|---|
| 51 | C$_4$H$_9$ | C$_4$H$_9$ | C(CH$_3$)$_3$ | CH$_3$ | CONHCH$_3$ | CH$_3$ | 0.81, 0.84 | 3.74, 3.37 | 524 |
| 52 | C$_4$H$_9$ | C$_4$H$_9$ | C(CH$_3$)$_3$ | CH$_3$ | 2-benzimidazolyl | CH$_3$ | 0.86, 0.93 | 3.11, 2.77 | 557 |
| 53 | C$_4$H$_9$ | C$_4$H$_9$ | CH(C$_2$H$_5$)C$_4$H$_9$ | CH$_3$ | 2-benzimidazolyl | CH$_3$ | 1.03, 1.36 | 2.00, 1.24 | 540 |

TABLE 3

| Ex. No. | R$^1$ | R$^2$ | R$^3$ | X | R$^6$ | Q* [mJ/dot] | m [1/mJ] | $\lambda_{max}$ [nm] |
|---|---|---|---|---|---|---|---|---|
| 54 | CH(CH$_3$)$_2$ | CH(CH$_3$)$_2$ | C(CH$_3$)$_3$ | N | C$_4$H$_9$ | 0.82, 0.89 | 3.97, 2.87 | 577 |
| 55 | C$_4$H$_9$ | C$_4$H$_9$ | C(CH$_3$)$_3$ | N | C$_4$H$_9$ | 0.85, 0.90 | 3.19, 2.93 | 576 |
| 56 | CH$_3$ | CH$_3$ | CH(C$_2$H$_5$)C$_4$H$_9$ | N | C$_4$H$_9$ | 0.88, 0.95 | 3.00, 2.31 | 563 |
| 57 | CH$_3$ | CH$_3$ | C(CH$_3$)$_3$ | N | C$_4$H$_9$ | 0.89, 0.90 | 2.83, 2.91 | 570 |
| 58 | C$_2$H$_5$ | C$_2$H$_4$OC$_2$H$_9$ | C(CH)$_3$ | CH | C$_4$H$_9$ | 0, 84 | 3, 96 | 532 |
| 59 | C$_2$H$_4$OCH$_3$ | C$_2$H$_4$OCH$_3$ | C(CH$_3$)$_3$ | CH | C$_3$H$_6$OC$_2$H$_5$ | 0, 87 | 3, 61 | 531 |
| 60 | C$_2$H$_4$OCOOCH$_3$ | C$_2$H$_9$ | C(CH$_3$)$_3$ | CH | C$_6$H$_{13}$ | 0, 91 | 3, 81 | 528 |

We claim:

1. A process for transferring dyes from a transfer to plastic-coated paper by diffusion or sublimation with the aid of an energy source, which comprises using a transfer on which there is or are one or more pyridone dyes of the formula I

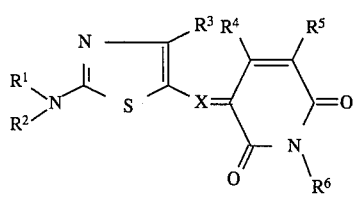

where

X is nitrogen or CH, $R^1$ and $R^2$ are identical or different and each is independently of the other $C_1$–$C_{10}$-alkyl with or without substitution by $C_1$–$C_4$-alkoxycarbonyl, $C_1$–$C_4$-alkoxycarbonyloxy or phenyl and with or without interruption by from 1 to 4 oxygen atoms in ether function, $C_5$–$C_7$-cycloalkyl, $C_3$–$C_4$-alkenyl, unsubstituted or $C_1$–$C_4$-alkyl-, $C_1$–$C_4$-alkoxy- or halogen-substituted phenyl, or $R^1$ and $R^2$ are together with the nitrogen atom joining them together a 5- or 6-membered saturated heterocyclic radical with or without further hetero atoms, $R^3$ is $C_3$–$C_{10}$-alkyl or $C_5$–$C_7$-cycloalkyl, $R^4$ is hydrogen, $C_1$–$C_4$-alkyl or unsubstituted or $C_1$–$C_4$-alkyl-, $C_1$–$C_4$-alkoxy- or halogen-substituted phenyl, $R^5$ is cyano, carbamoyl, mono- or di($C_1$–$C_8$-alkyl)carbamoyl, carboxyl, $C_1$–$C_8$-alkoxycarbonyl or benzimidazolyl, and $R^6$ is $C_1$–$C_{10}$-alkyl with or without substitution by phenyl, phenoxy, cyclohexyloxy or pyrazolyl and with or without interruption by from 1 to 4 oxygen atoms in ether function, $C_5$–$C_7$-cycloalkyl or unsubstituted or $C_1$–$C_4$-alkyl-, $C_1$–$C_4$-alkoxy- or halogen-substituted phenyl.

2. The process as claimed in claim 1, wherein X is CH.

3. The process as claimed in claim 1, wherein $R^4$ is methyl.

4. The process as claimed in claim 1, wherein $R^5$ is cyano.

5. The process as claimed in claim 1, wherein $R^3$ is branched $C_3$–$C_{10}$-alkyl.

6. The process as claimed in claim 1, wherein $R^6$ is $C_1$–$C_8$-alkyl, cyclopentyl, cyclohexyl or unsubstituted or $C_1$–$C_4$-alkyl- or $C_1$–$C_4$-alkoxy-substituted phenyl.

7. The process as claimed in claim 1, wherein, if $R^1$ and $R^2$ are each $C_1$–$C_{10}$-alkyl or if one of $R^1$ and $R^2$ is $C_1$–$C_{10}$-alkyl and the other is $C_5$–$C_7$-cycloalkyl, the sum of the carbon atoms present in the two radicals $R^1$ and $R^2$ is at least 7.

8. The process as claimed in claim 5, wherein $R^3$ is branched $C_3$–$C_8$-alkyl.

9. The process as claimed in claim 8, wherein $R^3$ is branched $C_3$–$C_6$ alkyl.

10. The process as claimed in claim 6, wherein $R^6$ is $C_4$–$C_8$ alkyl or cyclohexyl.

11. The process as claimed in claim 1, wherein $R^1$ and $R^2$ are each independently $C_4$–$C_8$-alkyl, $C_1$–$C_4$-alkoxy-$C_2$–$C_4$-alkyl, $C_1$–$C_4$-alkoxycarbonyl-$C_2$–$C_4$-alkyl, benzyl or prop-1-en-3-yl or one of $R^1$ and $R^2$ is $C_1$–$C_4$-alkyl and the other is cyclohexyl.

* * * * *